Patented Dec. 19, 1939

2,183,673

UNITED STATES PATENT OFFICE 2,183,673

COPPER COMPOUNDS OF PRIMARY RESORCINOL TRISAZO - DYESTUFFS AND THEIR MANUFACTURE

Fritz Dobler and Hans Buess, Basel, Switzerland, assignors to the firm J. R. Geigy S. A., Basel, Switzerland No Drawing. Application June 29, 1937, Serial No. 151,064. In Switzerland July 13, 1936

18 Claims. (Cl. 260—145)

It was found that new and useful copper compounds of primary ortho-hydroxy-resorcinol trisazo-dyestuffs are obtained, if resorcinol is coupled in an alkaline solution in the first place with a diazo-compound derived from a negatively substituted ortho-aminophenol, secondly with any desired diazo-compound and finally with a diazotized aminodiphenylamine sulphonic acid and treated with a copper salt. The new dyestuff-metal compounds distinguish themselves by their valuable clear and neutral brown tints and as already known for trisazo-dyestuffs of analogous constitution they have a very good affinity for weighted and unweighted silk and leather tanned with vegetable and chrome-tanning agents, but practically not for wool.

Brown trisazo-dyestuffs of resorcinol are already known by the German Patent 629,743. According to its process resorcinol is coupled in any succession in an alkaline medium with 1 molecule of diazotized 4-aminodiphenylamine-2-sulphonic acid and 1 molecule of diazotized 2-amino-1-hydroxy-6-nitrobenzene-4-sulphonic acid or diazotized 2-amino-1-hydroxy-4:6-dinitrobenzene, with ½ molecule of each of the two diazo-components respectively, and finally with 1 molecule of a diazo-compound of the benzene series which may be nitrated or halogenated. In the example which is customarily regarded as the best modus of performance of the process, diazotized 4-aminodiphenylamine-2-sulphonic acid is mentioned as the first diazo-component. In accordance with the practical knowledge gained from these and similar primary trisazo-dyestuffs the coupling succession is said to be without influence.

However, it was very surprising to find that by a definite order of the three couplings it is possible to obtain valuable dyestuffs the metal compounds of which distinguish themselves by their clear and neutral brown tints of very good fastness properties.

The factors decisive for the production of the new dyestuffs are the first and the third diazo-component. The first one must be a negatively substituted ortho-aminophenol, the last one a diazotized aminodiphenylamine sulphonic acid; the second diazo-component being any desired one. In the first place are used advantageously as diazo-component derived from a negatively substituted ortho-aminophenol for example 4- or 5-nitro-2-aminophenol, the 3-amino-2-hydroxy-benzoic acid, the 2-nitro-6-amino-1-hydroxybenzene-4-sulphonic acid, the isomeric 4:6:1:2-compound, 4:6 - dinitro-2-amino-1-hydroxybenzene, 2-amino-1-hydroxybenzene-4-sulpho-6-carboxylic acid, 4-chloro-2-amino-1-hydroxybenzene-6-sulphonic acid; in the third place aminodiphenylamine sulphonic acids with good coupling capacity have shown to be of great advantage, for example the 4-nitro-4'-aminodiphenylamine-2-sulphonic acid, the isomeric 2:4':4-compound, 4-aminodiphenylamine-2-sulphonic acid and 4'-methoxy - 4 - aminodiphenylamine - 2 - sulphonic acid. In the second place from any desired diazo-components nitrodiazo-compounds such as diazotized ortho-, meta- and para-nitraniline, o-chloro-p-nitraniline, 4-nitraniline-2-sulphonic acid or the isomeric 2:4-compound, nitroaminodiphenylamine sulphonic acids as indicated above are used to great advantage.

Instead of the single diazo compounds indicated in the three groups above, also mixtures of different diazo-components from the same groups may be used together.

The new dyestuffs distinguish themselves from those of German Patent No. 629,743 by their much clearer, neutral brown shades, due to the smooth course of their production. According to the process of the above mentioned patent the couplings of which are foaming strongly, ugly dull brown tones are obtained which, judging by their tint, cannot be trisazo-dyestuffs, or only very impure primary ones. Moreover, the fastness properties of the metal compounds of the new dyestuffs are superior to those of the dyestuffs made according to the known process. This refers especially to the fastness to light, partly also to the better fastness to fat liquor of the leather dyeings and the better fastness to washing and water of the dyeings on weighted and unweighted silk. If the dyestuffs of German Patent 629,743 are converted into the metal compounds, especially into the copper compounds, tints from brown with violet shade to distinctly violet in shade are obtained which are of little interest.

For the after-treatment of the dyestuffs the water soluble compounds of copper may be mentioned, such as copper sulphate, copper chloride, copper acetate and so on. The treatment with the metal-salts may be made in substance, in the dyeing bath, by after treatment of the dyeings or according to any other known process. The application of copper compounds proves to be of great advantage, the decomposition therewith going on very rapidly and smoothly.

The following examples illustrate the invention, the parts being by weight:

Example 1

23.4 parts of 2-nitro-6-amino-1-hydroxybenzene-4-sulphonic acid are dissolved in 150 parts of water of 80° C. with 6 parts of anhydrous sodium carbonate, cooled down to 5° C., acidified with 40 parts of hydrochloric acid (30%) and diazotized with 6.9 parts of nitrite. Temperature 2° C. The diazonium compound is added during 10 minutes to a solution of 11 parts of resorcinol and 45 parts of caustic soda lye (30%) in water and ice at 0° C. After 1 hour a solution of 13.8 parts of diazotized 4-nitro-1-aminobenzene is allowed to run into the solution of the monoazodyestuff, temperature 0° C., 24 parts of anhydrous sodium carbonate are added and a solution of 30.9 parts of 4-nitro-4'-aminodiphenylamine-2-sulphonic acid made in usual manner is allowed to flow in during 75 minutes approximately. After stirring for several hours the dyestuff is separated out with 75 parts of hydrochloric acid (30%) and 300 parts of salt and filtered.

If in the place of the 2-nitro-6-amino-1-hydroxybenzene-4-sulphonic acid as first component the isomeric 4:6:1:2-compound or picramic acid, in the second place a halogenated nitraniline such as 2-chloro-4-nitraniline, a nitraniline-sulphonic acid such as the 4-nitraniline-2-sulphonic acid or the isomeric 2:4-compound or the 4-nitro-4'-aminodiphenylamine-2-sulphonic acid or 1-naphthylamine-5-sulphonic acid, sulphanilic acid and so on are used, brown trisazo-dyestuffs with similar properties are obtained.

For the production of the metal compound the filter-cake obtained as described above is dissolved in 2400 parts of water, 52 parts of crystallized copper sulphate are added, heated up to 90-95° C. and kept for 30 minutes. When the reaction is complete there is allowed to cool down to 50° C. and then the coppered dyestuff precipitated with 400 parts of salt, filtered and dried at 80° C.

In the place of copper sulphate there may be used any other salt being soluble in acid medium; for example also copper carbonate may be used.

Example 2

23.3 parts of 3-amino-2-hydroxybenzene-1-carboxylic-5-sulphonic acid are dissolved in 100 parts of water of 80° C. with the aid of 12 parts of anhydrous sodium carbonate, cooled down to 0° C., precipitated with 34 parts of hydrochloric acid (30%) and diazotized with a solution of 6.9 parts of sodium nitrite. Meanwhile 11 parts of resorcinol are dissolved in 30 parts of water, 20 parts of anhydrous sodium carbonate are added at 0° C. and then the diazo-compound of 3-amino-2-hydroxybenzene-1-carboxylic-5-sulphonic acid. The coupling being complete, the solution of the monoazo-dyestuff is again cooled to 0° C., 20 parts of anhydrous sodium carbonate and 20 parts of caustic soda lye (30%) are added and 21.8 parts of 4-nitro-1-aminobenzene-2-sulphonic acid, diazotized in the usual manner, are allowed to flow in at 0° C. When coupling is complete, 20 parts of anhydrous sodium carbonate and 6.0 parts of caustic soda lye are given into the solution of the disazo-dyestuff and coupled at 0° C. with the diazo-compound made in the usual manner from 30.9 parts of 4-nitro-4'-aminodiphenylamine-2-sulphonic acid. The coupling being finished, the trisazo-dyestuff is precipitated with 400 parts of salt, 100 parts of potassium chloride and 180 parts of hydrochloric acid (30%) and filtered.

For the production of the metal compound the filtered cakes are dissolved in 2000 parts of water, 52 parts of crystallized copper sulphate and 28 parts of sodium acetate or equivalent parts of formate are added and heated at 90-95° C. for 30 minutes. The dyestuff containing copper is precipitated with 400 parts of salt, filtered and dried at 80° C.

It dyes silk and leather beautiful brown shades of excellent fastness to light and other good fastness properties.

In the second place the diazo-compound of nitraniline or in the second and third place the amines mentioned in Example 1 for the same coupling range may be used. The dyestuffs obtained have similar properties.

The conditions for coupling in the above examples may be varied for example by pre-addition in parts of the caustic or carbonate alkali or only by adding them after the dyestuff-forming component having been joined together. In just the same manner other alkalies, such as ammonia may be used.

What we claim is:

1. A process for the production of copper compounds of primary resorcinol trisazo-dyestuffs, consisting in reacting a water soluble copper salt with a trisazo-dyestuff of the general formula

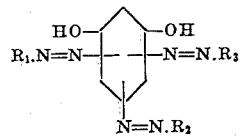

wherein $R_1$ means the radical of the first coupled diazo-compound made from a negatively substituted orthoaminophenol, $R_2$ means the radical of the secondly coupled diazo-compound made from any desired aromatic amine and $R_3$ means the radical of the finally coupled diazo-compound made from an aminodiphenylamine sulphonic acid, the trisazo-dyestuff being made in this order of coupling in alkaline solution.

2. A process for the production of copper compounds of primary resorcinol trisazo-dyestuffs, consisting in reacting a water soluble copper salt with a trisazo-dyestuff of the general formula

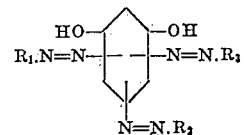

wherein $R_1$ means the radical of the first coupled diazo-compound made from a negatively substituted orthoaminophenol, $R_2$ means the radical of the secondly coupled diazo-compound made from a nitroamine of the benzene series and $R_3$ means the radical of the finally coupled diazo-compound made from an aminodiphenylamine sulphonic acid, the trisazo-dyestuff being made in this order of coupling in alkaline solution.

3. A process for the production of copper compounds of primary resorcinol trisazo-dyestuffs, consisting in reacting a water soluble copper salt with a trisazo-dyestuff of the general formula

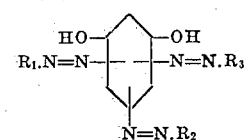

wherein $R_1$ means the radical of the first coupled diazo-compound made from a negatively substituted ortho-aminophenol, selected from the group consisting of 4-nitro-2-aminophenol, 5-nitro-2-aminophenol, 3-amino-2-hydroxybenzoic acid, 4-chloro-2-amino-1-hydroxybenzene-6-sulphonic acid, 2-nitro-6-amino-1-hydroxybenzene-4-sulphonic acid, 4-nitro-6-amino-1-hydroxybenzene-2-sulphonic acid, 4:6-dinitro-2-amino-1-hydroxybenzene, 2-amino-1-hydroxybenzene-4-sulpho-6-carboxylic acid, $R_2$ means the radical of the secondly coupled diazo-compound made from a nitroamine of the benzene series, selected from the group consisting of ortho-, meta-, para-nitraniline, ortho-chloro-para-nitraniline, 4-nitraniline-2-sulphonic acid, 2-nitraniline-4-sulphonic acid, and the aminodiphenylamine sulphonic acids mentioned in this claim under $R_3$, and $R_3$ means the radical of the finally coupled diazo-compound made from an aminodiphenylamine sulphonic acid, selected from the group consisting of 4-nitro-4'-aminodiphenylamine-2-sulphonic acid, 2-nitro-4'-aminodiphenylamine-4-sulphonic acid, 4'-methoxy-4-aminodiphenylamine-2-sulphonic acid and 4-aminodiphenylamine-2-sulphonic acid, the trisazo-dyestuff being made in this order of coupling in alkaline solution.

4. A process for the production of copper compounds of primary resorcinol trisazo-dyestuffs, consisting in reacting copper sulphate with a trisazo-dyestuff of the general formula

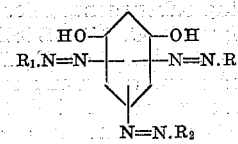

wherein $R_1$ means the radical of the first coupled diazo-compound made from a negatively substituted orthoaminophenol, $R_2$ means the radical of the secondly coupled diazo-compound made from any desired aromatic amine and $R_3$ means the radical of the finally coupled diazo-compound made from an aminodiphenylamine sulphonic acid, the trisazo-dyestuff being made in this order of coupling in alkaline solution.

5. A process for the production of copper compounds of primary resorcinol trisazo-dyestuffs, consisting in reacting copper sulphate with a trisazo-dyestuff of the general formula

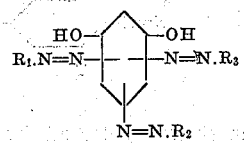

wherein $R_1$ means the radical of the first coupled diazo-compound made from a negatively substituted orthoaminophenol, $R_2$ means the radical of the secondly coupled diazo-compound made from a nitroamine of the benzene series and $R_3$ means the radical of the finally coupled diazo-compound made from an aminodiphenylamine sulphonic acid, the trisazo-dyestuff being made in this order of coupling in alkaline solution.

6. A process for the production of copper compounds of primary resorcinol trisazo-dyestuffs, consisting in reacting copper sulphate with a trisazo-dyestuff of the general formula

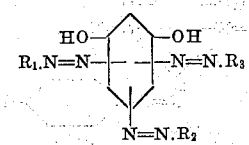

wherein $R_1$ means the radical of the first coupled diazo-compound made from a negatively substituted ortho-aminophenol, selected from the group consisting of 4-nitro-2-aminophenol, 5-nitro-2-aminophenol, 3-amino-2-hydroxybenzoic acid, 4-chloro-2-amino-1-hydroxybenzene-6-sulphonic acid, 2-nitro-6-amino-1-hydroxybenzene-4-sulphonic acid, 4-nitro-6-amino-1-hydroxybenzene-2-sulphonic acid, 4:6-dinitro-2-amino-1-hydroxybenzene, 2-amino-1-hydroxybenzene-4-sulpho-6-carboxylic acid, $R_2$ means the radical of the secondly coupled diazo-compound made from a nitroamine of the benzene series, selected from the group consisting of ortho-, meta-, para-nitraniline, ortho-chloro-para-nitraniline, 4-nitraniline-2-sulphonic acid, 2-nitraniline-4-sulphonic acid, and the aminodiphenylamine sulphonic acids mentioned in this claim under $R_3$, and $R_3$ means the radical of the finally coupled diazo-compound made from an aminodiphenylamine sulphonic acid, selected from the group consisting of 4-nitro-4'-aminodiphenylamine-2-sulphonic acid, 2-nitro-4'-aminodiphenylamine-4-sulphonic acid, 4'-methoxy-4-aminodiphenylamine-2-sulphonic acid and 4-aminodiphenylamine-2-sulphonic acid, the trisazo-dyestuff being made in this order of coupling in alkaline solution.

7. A process for the production of the copper compound of a primary resorcinol trisazo-dyestuff, consisting in reacting a copper salt selected from the group of copper sulphate, copper chloride, copper acetate and copper formate with a trisazo-dyestuff of the general formula

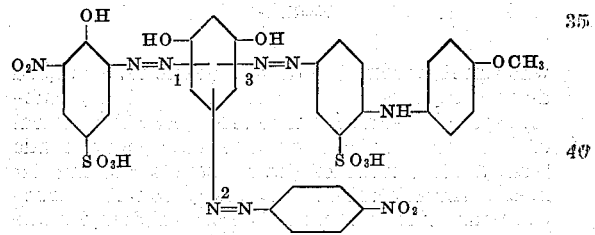

the numbers 1, 2, 3 indicating the order of coupling in alkaline solution.

8. A process for the production of the copper compound of a primary resorcinol trisazo-dyestuff, consisting in reacting a copper salt selected from the group of copper sulphate, copper chloride, copper acetate and copper formate with a trisazo-dyestuff of the general formula

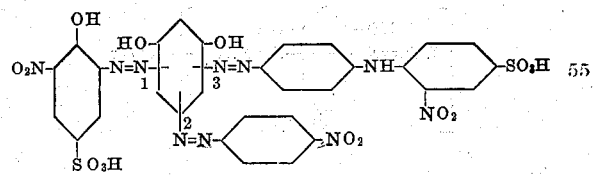

the numbers 1, 2, 3 indicating the order of coupling in alkaline solution.

9. A process for the production of the copper compound of a primary resorcinol trisazo-dyestuff, consisting in reacting a copper salt selected from the group of copper sulphate, copper chloride, copper acetate and copper formate with a trisazo-dyestuff of the general formula

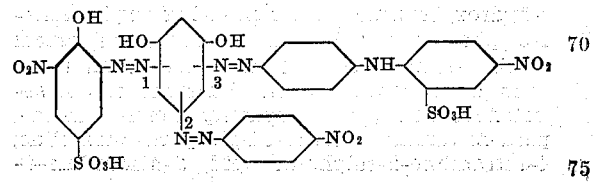

the numbers 1, 2, 3 indicating the order of coupling in alkaline solution.

10. The copper compounds of primary resorcinol trisazo-dyestuffs of the probable general formula

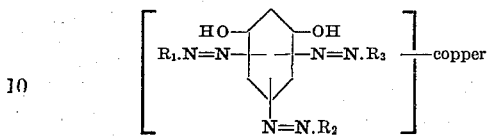

wherein $R_1$ means the radical of the first coupled diazo-compound made from a negatively substituted ortho-aminophenol, $R_2$ means the radical of the secondly coupled diazo-compound made from any desired aromatic amine and $R_3$ means the radical of the finally coupled diazo-compound made from an aminodiphenylamine sulphonic acid, the trisazo-dyestuff being made in this order of coupling in alkaline solution, being dark powders soluble in water to brown solutions dyeing silk and leather pure beautiful brown shades of very good fastness to light.

11. The copper compounds of primary resorcinol trisazo-dyestuffs of the probable general formula

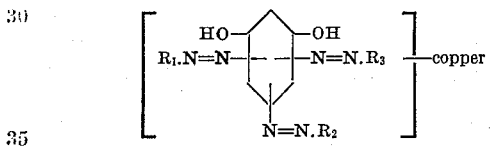

wherein $R_1$ means the radical of the first coupled diazo-compound made from a negatively substituted ortho-aminophenol, $R_2$ means the radical of the secondly coupled diazo-compound made from a nitroamine of the benzene series and $R_3$ means the radical of the finally coupled diazo-compound made from an amino-diphenylamine sulphonic acid, the trisazo-dyestuff being made in this order of coupling in alkaline solution, being dark powders soluble in water to brown solutions dyeing silk and leather pure beautiful brown shades of very good fastness to light.

12. The copper compounds of primary resorcinol trisazo-dyestuffs of the probable general formula

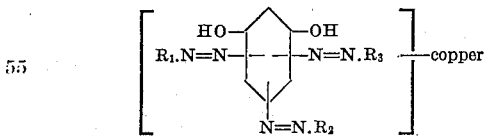

wherein $R_1$ means the radical of the first coupled diazo-compound made from a negatively substituted ortho-aminophenol, selected from the group consisting of 4-nitro-2-aminophenol, 5-nitro-2-aminophenol, 3-amino-2-hydroxybenzoic acid, 4-chloro-2-amino-1-hydroxybenzene-6-sulphonic acid, 2-nitro-6-amino-1-hydroxybenzene-4-sulphonic acid, 4-nitro-6-amino-1-hydroxybenzene-2-sulphonic acid, 4:6-dinitro-2-amino-1-hydroxybenzene, 2-amino-1-hydroxybenzene-4-sulpho-6-carboxylic acid, $R_2$ means the radical of the secondly coupled diazo-compound made from a nitroamine of the benzene series, selected from the group consisting of ortho-, meta-, para-nitraniline, ortho-chloro-para-nitraniline, 4-nitraniline-2-sulphonic acid, 2-nitraniline-4-sulphonic acid, and the aminodiphenylamine sulphonic acids mentioned in this claim under $R_3$, and $R_3$ means the radical of the finally coupled diazo-compound made from an aminodiphenylamine sulphonic acid, selected from the group consisting of 4-nitro-4'-aminodiphenylamine-2-sulphonic acid, 2-nitro-4'-aminodiphenylamine-4-sulphonic acid, 4'-methoxy-4-aminodiphenylamine-2-sulphonic acid and 4-aminodiphenylamine-2-sulphonic acid, the trisazo-dyestuff being made in this order of coupling in alkaline solution, being dark powders soluble in water to brown solutions dyeing silk and leather pure beautiful brown shades of very good fastness to light.

13. The copper compounds of primary resorcinol trisazo-dyestuffs of the probable general formula

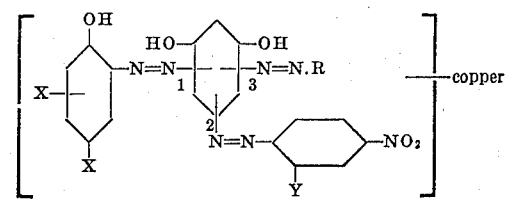

the two X's being substituents selected from the group consisting of H, Cl, $NO_2$, $SO_3H$ and COOH, at least one being different from H, Y being a substituent selected from the group of H and $SO_3$, and R being the radical of the finally coupled diazo-compound made from an aminodiphenylamine sulphonic acid, being dark powders soluble in water to brown solutions dyeing silk and leather pure beautiful brown shades of very good fastness to light.

14. The copper compounds of primary resorcinol trisazo-dyestuffs of the probable general formula

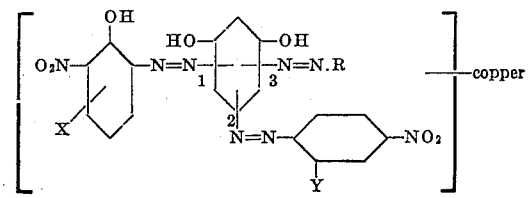

X being a substituent selected from the group consisting of H, $NO_2$ and $SO_3H$, Y being a substituent selected from the group of H and $SO_3$, and R being the radical of the finally coupled diazo-compound made from an aminodiphenylamine sulphonic acid, being dark powders soluble in water to brown solutions dyeing silk and leather pure beautiful brown shades of very good fastness to light.

15. The copper compounds of primary resorcinol trisazo-dyestuffs of the probable general formula

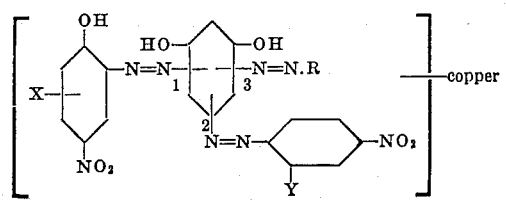

X being a substituent selected from the group consisting of H, NO₂, COOH and SO₃H, Y being a substituent selected from the group of H and SO₃, and R being the radical of the finally coupled diazo-compound made from an aminodiphenylamine sulphonic acid, being dark powders soluble in water to brown solutions dyeing silk and leather pure beautiful brown shades of very good fastness to light.

16. The copper compound of a primary resorcinol trisazo-dyestuff of the general formula

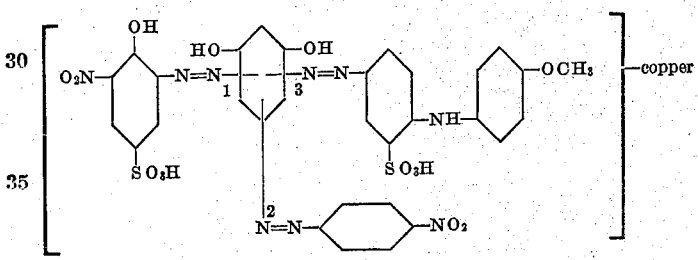

the numbers 1, 2, 3 indicating the order of coupling in alkaline solution, the said compound being a dark powder soluble in water to a brown solution dyeing silk and leather pure beautiful brown shades of very good fastness to light.

17. The copper compound of a primary resorcinol trisazo-dyestuff of the general formula

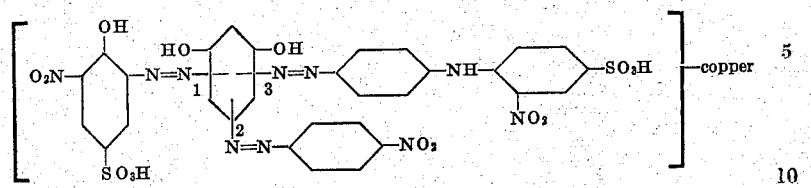

the numbers 1, 2, 3, indicating the order of coupling in alkaline solution, the said compound being a dark powder soluble in water to a brown solution dyeing silk and leather pure beautiful brown shades of very good fastness to light.

18. The copper compound of a primary resorcinol trisazo-dyestuff of the general formula

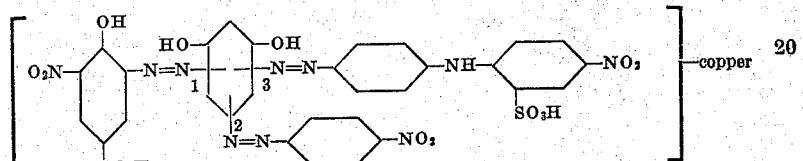

the numbers 1, 2, 3 indicating the order of coupling in alkaline solution, the said compound being a dark powder soluble in water to a brown solution dyeing silk and leather pure beautiful brown shades of very good fastness to light.

FRITZ DOBLER.
HANS BUESS.